United States Patent
Yu et al.

(10) Patent No.: US 11,849,309 B2
(45) Date of Patent: Dec. 19, 2023

(54) WIRELESS COMMUNICATION DEVICE FOR CONTROLLING TRANSMISSION POWER AND OPERATING METHOD THEREOF

(71) Applicant: Samsung Electronics Co., Ltd., Suwon-si (KR)

(72) Inventors: Hyunseok Yu, Suwon-si (KR); Gangminh Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 99 days.

(21) Appl. No.: 17/530,885

(22) Filed: Nov. 19, 2021

(65) Prior Publication Data

US 2022/0201624 A1 Jun. 23, 2022

(30) Foreign Application Priority Data

Dec. 18, 2020 (KR) .................. 10-2020-0178923
Mar. 16, 2021 (KR) .................. 10-2021-0034241

(51) Int. Cl.
*H04W 52/20* (2009.01)
*H04W 52/24* (2009.01)
*H04W 52/36* (2009.01)

(52) U.S. Cl.
CPC ....... *H04W 52/245* (2013.01); *H04W 52/367* (2013.01)

(58) Field of Classification Search
CPC ................ H04W 52/245; H04W 52/367
See application file for complete search history.

(56) References Cited

U.S. PATENT DOCUMENTS

| | | | |
|---|---|---|---|
| 7,610,027 B2 | 10/2009 | Alapuranen | |
| 8,538,351 B2 | 9/2013 | Wilson et al. | |
| 8,825,102 B2 | 9/2014 | Chakraborty et al. | |
| 9,128,184 B1* | 9/2015 | Bachmann | G01S 7/02 |
| 9,622,187 B2 | 4/2017 | Logan et al. | |
| 9,744,369 B2* | 8/2017 | Poon | A61N 1/3756 |
| 9,900,204 B2* | 2/2018 | Levesque | H03F 3/195 |
| 10,129,834 B2* | 11/2018 | Yao | H04W 52/367 |
| 10,251,137 B2* | 4/2019 | Kim | H04W 52/225 |

(Continued)

FOREIGN PATENT DOCUMENTS

EP 3474609 A1 4/2019

OTHER PUBLICATIONS

Extended European Search Report dated May 9, 2022 for corresponding EP Patent Application No. 21208951.0.

*Primary Examiner* — Hai V Nguyen
(74) *Attorney, Agent, or Firm* — Harness, Dickey & Pierce, P.L.C.

(57) ABSTRACT

A method of controlling transmission power of a wireless communication device includes obtaining first electromagnetic wave information from the wireless communication device, the first electromagnetic wave information being obtained during a target duration, obtaining electromagnetic wave tendency information in the target duration based on the first electromagnetic wave information and second electromagnetic wave information, the second electromagnetic wave information being obtained during at least one previous duration, and controlling the transmission power based on the electromagnetic wave tendency information.

20 Claims, 12 Drawing Sheets

(56) References Cited

U.S. PATENT DOCUMENTS

| | | | |
|---|---|---|---|
| 10,652,839 B2* | 5/2020 | Park | H04W 52/34 |
| 10,742,249 B2 | 8/2020 | Lan et al. | |
| 11,071,067 B2* | 7/2021 | Park | H04B 17/102 |
| 11,253,732 B2* | 2/2022 | Mayer | A61M 1/84 |
| 11,388,676 B2* | 7/2022 | Belghoul | H04W 52/367 |
| 11,462,948 B2* | 10/2022 | Park | H02J 50/20 |
| 11,595,072 B2* | 2/2023 | Zhang | H04W 28/0268 |
| 2017/0332333 A1 | 11/2017 | Santhanam et al. | |
| 2018/0020413 A1* | 1/2018 | Kim | H04W 52/225 |
| 2018/0288709 A1* | 10/2018 | Yao | H04W 52/367 |
| 2019/0124605 A1* | 4/2019 | Park | H04W 52/34 |
| 2020/0275387 A1* | 8/2020 | Park | H04W 52/146 |
| 2020/0306528 A1* | 10/2020 | Linden | A61N 1/36114 |
| 2021/0376664 A1* | 12/2021 | Park | H04W 52/283 |
| 2022/0171045 A1* | 6/2022 | Johnston | H02J 50/60 |
| 2022/0176133 A1* | 6/2022 | Buddha | A61N 1/3787 |

\* cited by examiner

WIRELESS COMMUNICATION DEVICE FOR CONTROLLING TRANSMISSION POWER AND OPERATING METHOD THEREOF

CROSS-REFERENCE TO RELATED APPLICATIONS

This application is based on and claims priority under 35 U.S.C. § 119 to Korean Patent Application Nos. 10-2020-0178923, filed on Dec. 18, 2020, and 10-2021-0034241, filed on Mar. 16, 2021, in the Korean Intellectual Property Office, the disclosures of which are incorporated by reference herein in their entireties.

BACKGROUND

The inventive concepts relate to a wireless communication device, and more particularly, to a wireless communication device and method for controlling transmission power.

In a wireless communication system, signal transmission is easily affected by path loss, shadow fading, and the like, and thus, sufficient power may be used so as not to decrease the quality of service (QoS). In particular, for wireless communication using a signal in a high frequency band such as the millimeter wave spectrum (mmWave), which is easily attenuated, high transmission power may be used. However, as the transmission power increases, heating in a wireless communication device may increase, and an electromagnetic wave of a high density may be generated during transmission. Accordingly, it may be desirable to reduce the energy absorbed from a wireless communication device, e.g., by a user of a terminal, due to an electromagnetic wave.

SUMMARY

The inventive concepts provide a method and apparatus for efficiently controlling exposure of a user to an electromagnetic wave while maintaining the quality of wireless communication.

According to an aspect of the inventive concepts, there is provided a method of controlling transmission power of a wireless communication device, the method including obtaining first electromagnetic wave information from the wireless communication device, the first electromagnetic wave information being obtained during a target duration, obtaining electromagnetic wave tendency information in the target duration based on the first electromagnetic wave information and second electromagnetic wave information, the second electromagnetic wave information being obtained during at least one previous duration, and controlling the transmission power based on the electromagnetic wave tendency information.

According to an aspect of the inventive concepts, there is provided a wireless communication device for controlling transmission power including processing circuitry configured to generate electromagnetic wave tendency information in a target duration based on electromagnetic wave information obtained in each of the target duration and at least one previous duration, and control the transmission power based on the electromagnetic wave tendency information, and at least one power amplifier configured to output an amplified transmission signal according to the transmission power.

According to an aspect of the inventive concepts, there is provided a method of limiting transmission power during a measuring duration, the method including obtaining electromagnetic wave information from a wireless communication device during a target duration, and limiting the transmission power such that only a portion of a desired transmission power is output in a limitation mode, the limitation mode being activated according to electromagnetic wave tendency information in the target duration, the measuring duration including the target duration, wherein the limiting of the transmission power comprises setting a transmission power limit according to a remaining rate, the remaining rate being based on a ratio of a remaining transmission power to an available transmission power during the measuring duration.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Hereinafter, embodiments of the inventive concepts will be described in detail with reference to the accompanying drawings.

Figure 1:
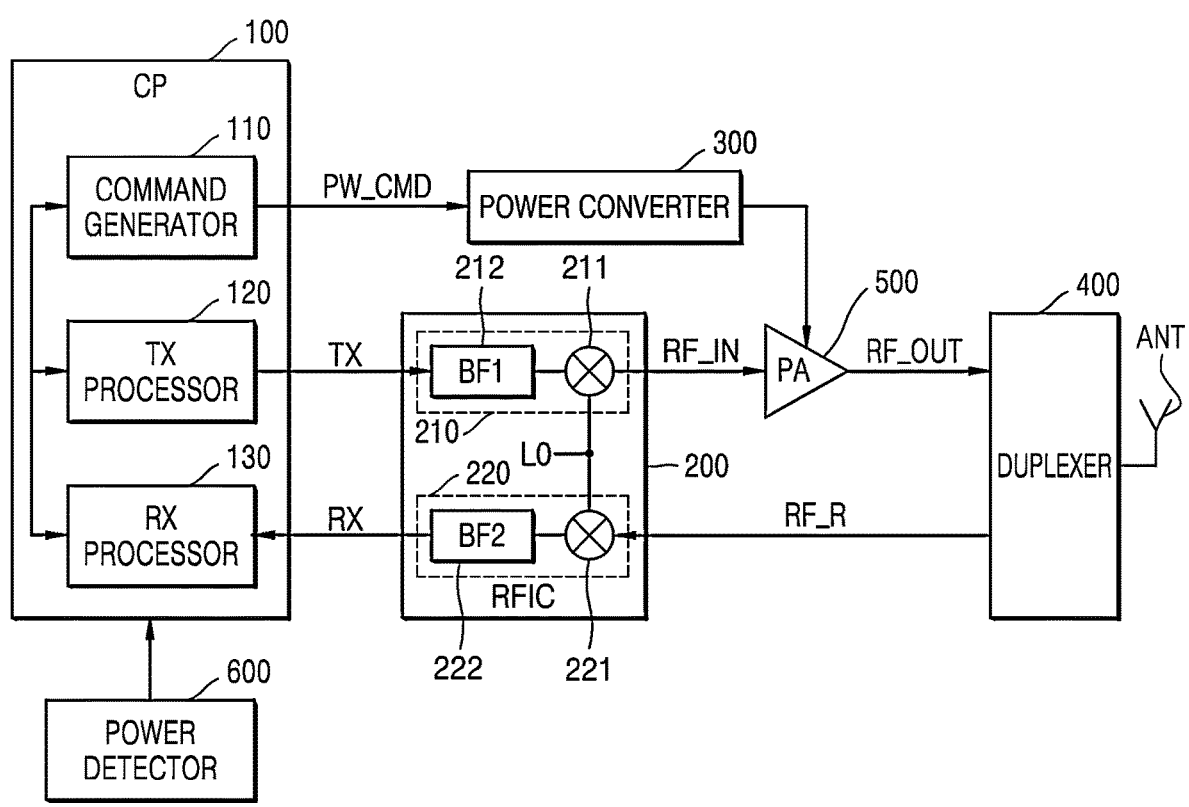
FIG. 1 is a block diagram of a wireless communication device according to embodiments of the inventive concepts.

FIG. 1 is a block diagram of a wireless communication device 10 according to embodiments of the inventive concepts.

Referring to FIG. 1, the wireless communication device 10 according to embodiments of the inventive concepts may include a communication processor 100, a radio frequency integrated circuit (RFIC) 200, a power converter 300, a duplexer 400, a power amplifier 500, a power detector 600, and/or an antenna ANT.

The communication processor 100 included in the wireless communication device 10 may include a command generator 110, a transmission (TX) processor 120, and/or a reception (RX) processor 130. The communication processor (CP) 100 may process, according to a determined communication scheme, a baseband signal (e.g., including an I signal and a Q signal) including information to be transmitted through the transmission processor 120. In addition, the communication processor 100 may process a received baseband signal through the reception processor 130 according to a determined communication scheme.

For example, the communication processor 100 may process a signal to be transmitted or a received signal according to a communication scheme such as orthogonal frequency division multiplexing (OFDM), orthogonal frequency division multiple access (OFDMA), wideband code division multiple access (WCDMA), or high speed packet access+(HSPA+). Besides, the communication processor 100 may process a baseband signal according to various types of communication schemes (e.g., various communication schemes to which a technique of modulating, or demodulating, an amplitude and/or a frequency of the baseband signal is applied)

The communication processor 100 may generate a power command PW_CMD through the command generator 110, the power command PW_CMD instructing (e.g., indicating and/or containing an instruction) to output at least a portion of required (or desired) transmission power. For example, the command generator 110 may generate a command indicating that limited transmission power is to be output, when transmission power required (or desired) to perform an optimal (or successful) wireless communication operation is limited according to a specific absorption rate (SAR) of the wireless communication device 10. Herein, the required (or desired) transmission power may be proportional to an amplitude component (e.g., magnitudes of an I signal and a Q signal) of a baseband signal.

The command generator 110, the transmission processor 120, and the reception processor 130 in the communication processor 100 may be configured by different modules, respectively, to output signals, but the command generator 110, the transmission processor 120, and the reception processor 130 according to the inventive concepts are not limited thereto and may indicate a processor configured by a single module to perform different functions.

The communication processor 100 may generate a transmission signal TX that is an analog signal by using a plurality of digital/analog converters provided therein, each digital/analog converter performing digital/analog conversion on a baseband signal. The communication processor 100 may receive a reception signal RX that is an analog signal from the RFIC 200. In addition, the communication processor 100 may extract a baseband signal that is a digital signal by analog/digital-converting the reception signal RX through an analog to digital converter (ADC) provided therein. Herein, each of the transmission signal TX and the reception signal RX may be a differential signal including a positive signal and a negative signal.

The RFIC 200 may generate an RF input signal RF_IN by up-converting a frequency of the transmission signal TX or generate the reception signal RX by down-converting a frequency of an RF reception signal RF_R. Particularly, the RFIC 200 may include a transmission circuit 210 configured to perform frequency up-conversion, a reception circuit 220 configured to perform frequency down-conversion, and/or a local oscillator LO.

The transmission circuit 210 may include a first mixer 211 and/or a first baseband filter 212. For example, the first baseband filter 212 may include a low-pass filter. The first baseband filter 212 may filter the transmission signal TX received from the communication processor 100 and provide the filtered transmission signal TX to the first mixer 211. The first mixer 211 may perform frequency up-conversion to convert a frequency of the transmission signal TX from a baseband to a high frequency band based on a frequency signal provided from the local oscillator LO. Through this frequency up-conversion, the transmission signal TX may be provided to the power amplifier 500 as the RF input signal RF_IN. The transmission circuit 210 may further include a transmission amplifier, and the transmission amplifier may primarily amplify power of the RF input signal RF_IN and provide the power-amplified RF input signal RF_IN to the power amplifier 500.

The power amplifier 500 may receive a power source voltage from the power converter 300 and generate an RF output signal RF_OUT by amplifying power of the RF input signal RF_IN based on the received power source voltage. Thereafter, the power amplifier 500 may provide the generated RF output signal RF_OUT to the duplexer 400.

The reception circuit 220 may include a second mixer 221 and/or a second baseband filter 222. The second mixer 221 may perform frequency down-conversion to convert a frequency of the RF reception signal RF_R from a high-frequency band to a baseband based on a frequency signal provided from the local oscillator LO. Through this frequency down-conversion, the RF reception signal RF_R may be provided to the second baseband filter 222 as the reception signal RX, and the second baseband filter 222 may filter the reception signal and provide the filtered reception signal RX to the communication processor 100. The reception circuit 220 may further include a reception amplifier, and the reception amplifier may be, for example, a low-noise amplifier including a low-pass filter. The reception amplifier may amplify the RF reception signal RF_R received from the duplexer 400 and provide the amplified RF reception signal to the second mixer 221.

As a reference, the wireless communication device 10 may transmit and receive signals through a plurality of frequency bands by using carrier aggregation (CA). In addition, to this end, the wireless communication device 10 may include a plurality of power amplifiers 500 configured to amplify powers of a plurality of RF input signals respectively corresponding to a plurality of carriers. However, for convenience of description, an example in which the number of power amplifiers 500 is 1 is described in embodiments of FIG. 1.

When a power source voltage of a fixed level is applied to the power amplifier 500, power efficiency of the power amplifier 500 may decrease. The power converter 300 according to embodiments of the inventive concepts may generate a power source voltage having a dynamically changing level, in response to the power command PW_CMD, and provide the generated power source voltage to the power amplifier 500. According to embodiments of the inventive concepts, the communication processor 100 may determine whether to limit transmission power, according to a tendency of electromagnetic wave information obtained in a target duration, and when the transmission power is limited, the communication processor 100 may set limited transmission power according to a remaining rate with respect to available transmission power. In this case, the communication processor 100 may generate the power command PW_CMD so as to output, according to the limited transmission power, only a portion of transmission power desired for wireless communication.

The duplexer 400 may be connected to the antenna ANT and separate a transmission frequency from a reception frequency. Particularly, the duplexer 400 may separate the RF output signal RF_OUT provided from the power amplifier 500 for each frequency band and provide the frequency-separated RF output signal RF_OUT to a corresponding antenna ANT. In addition, the duplexer 400 may provide an external signal received from the antenna ANT to the low-noise amplifier of the reception circuit 220 in the RFIC 200. For example, the duplexer 400 may include a front end module with integrated duplexer (FEMiD).

As a reference, the wireless communication device 10 may include a switch structure capable of separating a transmission frequency from a reception frequency, instead of the duplexer 400. Alternatively, the wireless communication device 10 may include a structure including the duplexer 400 and a switch to separate a transmission frequency from a reception frequency. However, for convenience of description, an example in which the wireless communication device 10 includes the duplexer 400 capable of separating a transmission frequency from a reception frequency is described in embodiments of the inventive concepts.

The antenna ANT may transmit the RF output signal RF_OUT frequency-separated by the duplexer 400 to the outside or provide the RF reception signal RF_R received from the outside to the duplexer 400. The antenna ANT may include an array antenna but is not limited thereto.

The power detector 600 may generate a total amount of transmission power output by the wireless communication device 10 during a target duration, by measuring transmission power generated by the wireless communication device 10. The power detector 600 may provide the total amount of transmission power to the communication processor 100, and the communication processor 100 may estimate electromagnetic wave information based on transmission power during the target duration.

The communication processor 100, the RFIC 200, the power converter 300, the duplexer 400, the power amplifier 500, and the power detector 600 may be implemented as individual integrated circuits (ICs), chips, or modules. In addition, the communication processor 100, the RFIC 200, the power converter 300, the duplexer 400, the power amplifier 500, and the power detector 600 may be mounted on a printed circuit board (PCB). However, embodiments of the inventive concepts are not limited thereto, and in embodiments, at least some of the communication processor 100, the RFIC 200, the power converter 300, the duplexer 400, and the power amplifier 500 may be implemented as a single communication chip.

Furthermore, the wireless communication device 10 shown in FIG. 1 may be included in a wireless communication system using a cellular network such as fifth generation (5G), long term evolution (LTE), or LTE-Advanced, or included in a wireless local area network (WLAN) system, a wireless fidelity (WiFi) system, a Bluetooth communication system, or another wireless communication system. As a reference, a configuration of the wireless communication device 10 shown in FIG. 1 is only an example, and thus, is not limited thereto, and the wireless communication device 10 may be variously configured according to a communication standard or a communication scheme.

Figure 2:
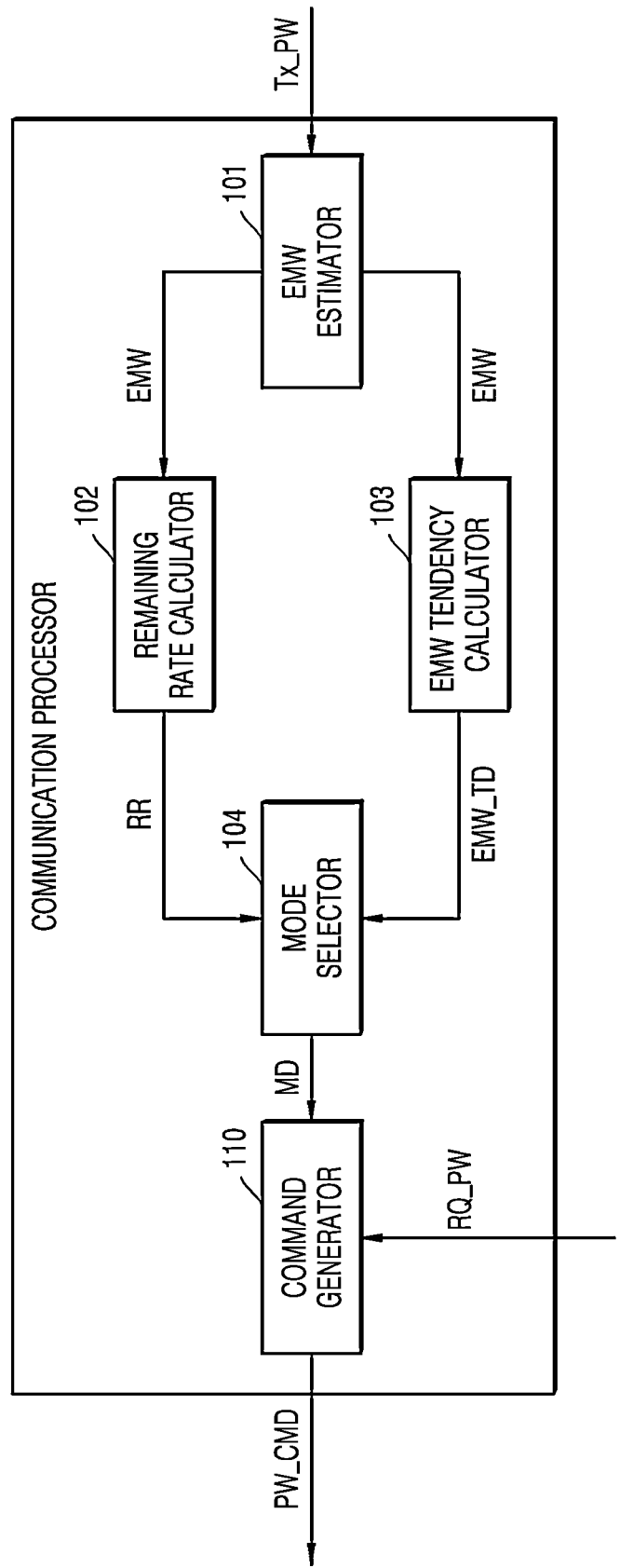
FIG. 2 is a block diagram of a communication processor according to embodiments of the inventive concepts.

FIG. 2 is a block diagram of the communication processor 100 according to embodiments of the inventive concepts.

Referring to FIG. 2, the communication processor 100 may include an electromagnetic wave information estimator 101, a remaining rate calculator 102, an electromagnetic wave tendency information calculator 103, a mode selector 104, and/or the command generator 110 according to calculation operations to be performed. Subjects configured to perform respective calculation operations may be software module units formed in one hardware module and configured to perform different calculations but are not limited thereto, and the subjects may be formed in different hardware modules to perform the respective calculation operations.

The electromagnetic wave information estimator 101 may receive, from the power detector 600 of FIG. 1, a total amount of transmission power Tx_PW during a target duration and estimate electromagnetic wave information EMW of the target duration based on the total amount of the transmission power Tx_PW. The electromagnetic wave information EMW may include, for example, an SAR and/or a power density (PD), and the SAR and/or the PD may have values proportional to the transmission power Tx_PW. According to embodiments, the electromagnetic wave information estimator 101 may estimate an SAR and/or a PD of the target duration based on a proportional formula of the SAR and/or the PD to the transmission power Tx_PW. According to embodiments, the electromagnetic wave information estimator 101 may calculate the SAR and/or the PD based on a strength of transmission power during the target duration. According to embodiments, the electromagnetic wave information estimator 101 may estimate the electromagnetic wave information EMW from the transmission power Tx_PW based on mapping data of electromagnetic wave information stored in a memory device (e.g., a memory device included in the wireless communication device 10).

The remaining rate calculator 102 may receive the electromagnetic wave information EMW of the target duration from the electromagnetic wave information estimator 101 and calculate a remaining rate RR that is a ratio of remaining transmission power to available transmission power. Herein, the remaining transmission power may be a value obtained by subtracting a cumulative transmission power used during a measuring duration from the available transmission power. According to embodiments, the communication processor 100 may update the remaining transmission power (e.g., determine an updated amount of the remaining transmission power) obtained during at least one previous duration based on electromagnetic wave information obtained during a target duration to obtain an updated remaining transmission power. According to embodiments, the remaining rate calculator 102 may calculate the remaining rate RR as a ratio of the updated remaining transmission power to the available transmission power.

The electromagnetic wave tendency information calculator 103 may calculate electromagnetic wave tendency information EMW_TD by receiving the electromagnetic wave information EMW of the target duration from the electromagnetic wave information estimator 101. The electromagnetic wave tendency information EMW_TD may be an index indicating a tendency of the electromagnetic wave information EMW of the target duration with respect to electromagnetic wave information EMW of at least one previous duration, e.g., a slope value of the electromagnetic wave information EMW of the target duration with respect to the electromagnetic wave information EMW of the at least one previous duration.

The mode selector 104 may select any one of a plurality of modes MD based on the electromagnetic wave tendency information EMWP_TD and the remaining rate RR generated by the electromagnetic wave tendency information calculator 103 and the remaining rate calculator 102, respectively. The plurality of modes MD may include a limitation mode of limiting transmission power, and particularly, include a plurality of modes of setting transmission power to be limited according to the remaining rate RR.

The mode selector 104 may determine whether to limit transmission power according to the electromagnetic wave tendency information EMW_TD, and when an SAR or a PD significantly increases during the target duration, the mode selector 104 may select a mode of limiting the transmission power Tx_PW. For example, when a slope value of the electromagnetic wave information EMW of the target duration exceeds a reference slope value, the mode selector 104 may select the limitation mode.

When the limitation mode is selected, the mode selector 104 may determine a degree of limiting the transmission power Tx_PW, according to the remaining rate RR. For example, the mode selector 104 may select any one of a general limitation mode, a maintaining limitation mode, a save limitation mode, and/or a maximum (or greatest) limitation mode, and the communication processor 100 may differently set limited transmission power according to each limitation mode.

When the limitation mode is set, the command generator 110 may set the limited transmission power and generate the power command PW_CMD by comparing the limited transmission power to required (or desired) transmission power RQ_PW. For example, when the required (or desired) transmission power RQ_W is lower than the limited transmission power, the command generator 110 may generate the power command PW_CMD so as to output transmission power of the power amplifier 500 as the required (or desired) transmission power RQ_PW. Otherwise, when the required (or desired) transmission power RQ_PW is higher than or equal to the limited transmission power, the command generator 110 may generate the power command PW_CMD so that the power amplifier 500 outputs the limited transmission power.

Figure 3:
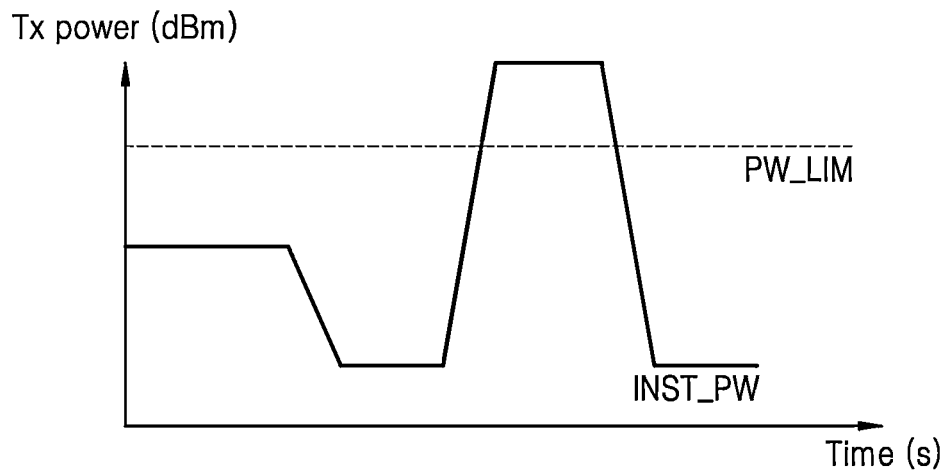
FIG. 3 is a graph of an example of limiting transmission power to limit electromagnetic wave emission, according to embodiments.

FIG. 3 is a graph of an example of limiting transmission power to limit electromagnetic wave emission, according to embodiments.

When wireless communication is performed by the wireless communication device 10, an RF emission amount according to a frequency-specific time average is limited, and it is determined whether the RF emission amount is limited according to limitation of an SAR and a PD. In this case, RF exposure limitation may be defined based on a time-average exposure degree during a measuring duration.

Referring to FIG. 3, instantaneous transmission power INST_PW of the wireless communication device 10 according to embodiments of the inventive concepts may exceed limited transmission power PW_LIM, but average transmission power during the measuring duration is controlled to be lower than the limited transmission power PW_LIM. That is, an exposure rate that is a ratio of the average transmission power to the limited transmission power PW_LIM is maintained as value of 1 or less.

The wireless communication device 10 according to the inventive concepts may track a tendency of the instantaneous transmission power INST_PW and determine whether to control transmission power to be lower than the limited transmission power PW_LIM according to the tracked tendency, and when the transmission power is controlled to be lower than the limited transmission power PW_LIM, the wireless communication device 10 may dynamically set the limited transmission power PW_LIM according to remaining transmission power during the measuring duration. Accordingly, the wireless communication device 10 may provide a method of efficiently controlling transmission power so that an optimal (or successful) wireless communication operation (e.g., a wireless communication operation at a desired signal strength) is performed while following an RF exposure limitation.

Figure 4:
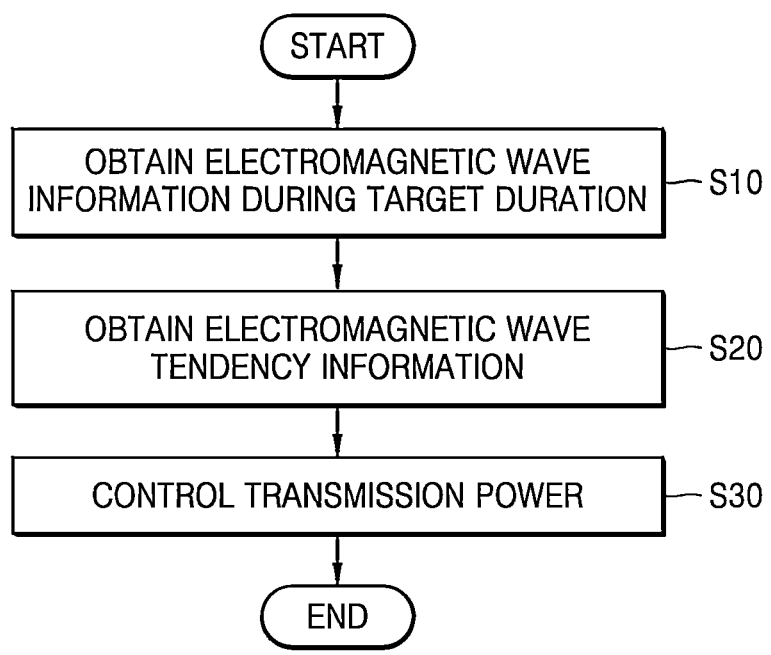
FIG. 4 is a flowchart of an operating method of a wireless communication device, according to embodiments of the inventive concepts.

FIG. 4 is a flowchart of an operating method of the wireless communication device 10, according to embodiments of the inventive concepts.

Referring to FIG. 4, the wireless communication device 10 may obtain electromagnetic wave tendency information and determine whether to limit transmission power by comparing the electromagnetic wave tendency information to a preset or alternatively, given tendency value.

In operation S10, the wireless communication device 10 may obtain electromagnetic wave information during a target duration (e.g., a target period of time). The electromagnetic wave information may be any one of an SAR and/or a PD, and any one of the SAR and/or the PD may be selected according to a frequency band in which wireless communication is to be performed. For example, the wireless communication device 10 may use a PD as the electromagnetic wave information when wireless communication is performed in a frequency band of 6 GHz or more, and use an SAR as the electromagnetic wave information when wireless communication is performed in a frequency band of 3 GHz or less. The wireless communication device 10 may obtain transmission power generated during the target duration and determine an SAR and a PD based on the transmission power.

In operation S20, the wireless communication device 10 may obtain electromagnetic wave tendency information based on the electromagnetic wave information generated during the target duration. The electromagnetic wave tendency information may indicate an increase or decrease degree of instantaneous transmission power. The wireless communication device 10 may load electromagnetic wave information during a previous duration before the target duration from a memory device (e.g., from the memory device included in the wireless communication device 10) to obtain tendency information during a measuring duration (e.g., a measuring period of time) including the target duration. The wireless communication device 10 may obtain the electromagnetic wave tendency information by comparing the electromagnetic wave information during the previous duration to the electromagnetic wave information during the target duration.

In operation S30, the wireless communication device 10 may control transmission power based on the electromagnetic wave tendency information. For example, when the electromagnetic wave tendency information tends to rapidly increase based on a preset or alternatively, given criterion, the wireless communication device 10 may limit the transmission power. Otherwise, when the electromagnetic wave tendency information tends to decrease or does not tend to rapidly increase based on the preset or alternatively, given criterion, the wireless communication device 10 may output the transmission power corresponding to required (or desired) transmission power without limiting the transmission power (e.g., without limiting the transmission power to a transmission power limit).

When the wireless communication device 10 limits the transmission power, a degree of limitation may be determined according to a ratio of remaining transmission power to available transmission power. That is, the wireless communication device 10 according to the inventive concepts may dynamically set limited transmission power (e.g., the transmission power limit) that is a reference for limiting the transmission power, and accordingly, the wireless communication device 10 may follow a transmission power limitation (e.g., by outputting transmission power not exceeding the transmission power limit) while minimizing (or reducing) a decrease in quality of wireless communication.

Figure 5:
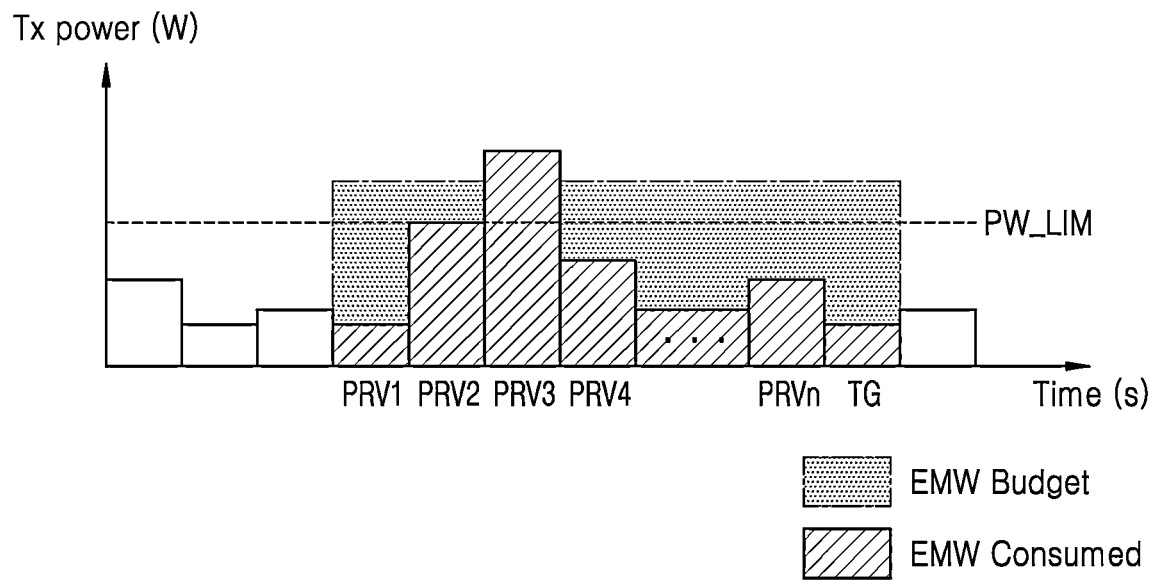
FIG. 5 is a graph of an example of obtaining electromagnetic wave information during a measuring duration, according to embodiments.

FIG. 5 is a graph of an example of obtaining electromagnetic wave information during a measuring duration, according to embodiments.

Referring to FIG. 5, the measuring duration may include first to nth previous durations PRV1 to PRVn (n is a natural number) and a target duration TG. The measuring duration is a duration for which an average transmission power is extracted to follow an RF exposure limitation and may have a different duration for each frequency. For example, the measuring duration may have 100 seconds in a band of less than 3 GHz and have 60 seconds in a band of greater than or equal to 3 GHz and less than 6 GHz. In addition, the measuring duration may have 4 seconds in a band of greater than or equal to 6 GHz. That is, when the wireless communication device 10 performs a wireless communication operation in a band of less than 3 GHz, the wireless communication device 10 may measure SARs for 100 seconds and control transmission power so that an average transmission power for 100 seconds does not exceed the limited transmission power PW_LIM.

The wireless communication device 10 according to the inventive concepts may divide the measuring duration into a plurality of durations and control transmission power based on electromagnetic wave information obtained in each duration, so that average transmission power does not exceed the limited transmission power PW_LIM.

According to embodiments of FIG. 5, the communication processor 100 in the wireless communication device 10 may divide the measuring duration into n+1 durations and obtain electromagnetic wave information in each duration. In this case, a lately (or most recently) measured duration among the measuring duration may be the target duration TG, and n durations before the target duration TG may be the first to nth previous durations PRV1 to PRVn. The wireless communication device 10 may determine whether to limit transmission power by comparing electromagnetic wave information measured in the target duration TG to pieces of electromagnetic wave information measured in the first to nth previous durations PRV1 to PRVn.

The wireless communication device 10 may generate electromagnetic wave tendency information by comparing at least one of pieces of previous electromagnetic wave information respectively measured in the first to nth previous durations PRV1 to PRVn to target electromagnetic wave information measured in the target duration TG and, for example, generate, as electromagnetic wave information, a slope value of the target electromagnetic wave information with respect to the pieces of previous electromagnetic wave information. In this case, the communication processor 100 may generate, as the slope value, a difference between the target electromagnetic wave information and average electromagnetic wave information of the pieces of previous electromagnetic wave information but is not limited thereto, and the communication processor 100 may generate, as the slope value, a difference between the target electromagnetic wave information and a minimum (or lowest) value of the pieces of previous electromagnetic wave information. The generating, performed by the communication processor 100, of the electromagnetic wave tendency information is not limited to using only any one of the pieces of previous electromagnetic wave information and may include using all of the pieces of previous electromagnetic wave information.

When the communication processor 100 limits transmission power in the limitation mode, a ratio of remaining transmission power to available transmission power may be calculated as a remaining rate, and the limited transmission power PW_LIM may be set based on a comparison result obtained by comparing the remaining rate to at least one threshold rate. Referring to FIG. 5, the available transmission power may be set so as for the transmission power output from the wireless communication device 10 during the measuring duration not to exceed pre-defined (or alternatively, given) maximum (or highest) limited transmission power (e.g., an EMW budget). For example, when the measuring duration includes 10 time windows, and the maximum (or highest) limited transmission power which the wireless communication device 10 is limited to output during the measuring duration is 200 dBm, the available transmission power may be 200 dBm. In this case, the wireless communication device 10 may select one of the plurality of limitation modes according to a remaining transmission power amount obtained by subtracting used transmission power from 200 dBm.

When the wireless communication device 10 does not operate in the limitation mode, a wireless communication operation may be performed with the desired transmission power regardless of the maximum (or highest) limited transmission power, but when the wireless communication device 10 operates in the limitation mode, the limited transmission power PW_LIM may be set to any one of levels lower than the maximum (or highest) limited transmission power to adjust cumulative transmission power (e.g., EMW consumed) during the measuring duration. A method, performed by the wireless communication device 10, of setting the limited transmission power PW_LIM which is variable will be described below with reference to FIGS. 9 and 10.

Figure 6:
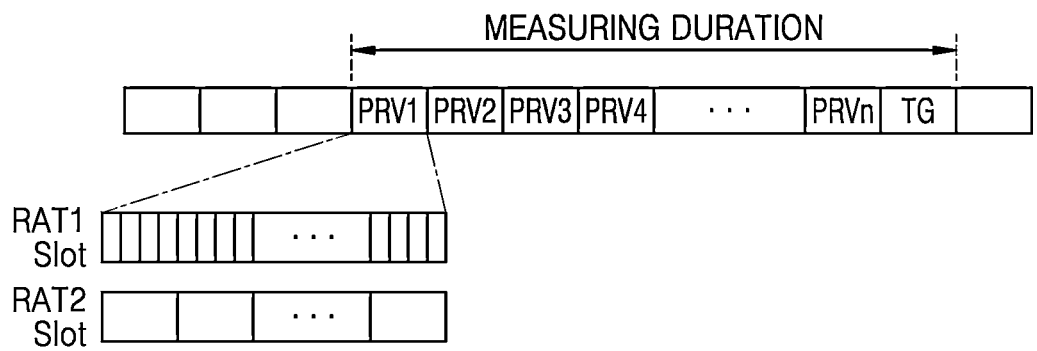
FIG. 6 illustrates time slots included in a previous duration and a target duration, according to embodiments.

FIG. 6 illustrates time slots included in a previous duration and a target duration, according to embodiments.

Referring to FIG. 6, a measuring duration may be divided into n+1 durations, and the divided durations may be referred to as time windows. Each of the first to nth previous durations PRV1 to PRVn and the target duration TG may include a plurality of time slots. The plurality of time slots may be time units defined in a wireless communication operation or, for example, units in which transmission power required by an application processor or the communication processor 100 is changed. That is, the wireless communication device 10 may obtain electromagnetic wave information of each of the first to nth previous durations PRV1 to PRVn and the target duration TG by measuring transmission power output for each time slot and summing the transmission power measured in each time slot.

When the wireless communication device 10 is connected to two or more wireless communication systems, all electromagnetic waves due to the connections to the two or more wireless communication systems may be involved in following an RF emission limitation regulation. Different wireless communication systems, e.g., 5G new radio (NR) and LTE systems, may be defined by different durations of a time slot, and in embodiments, a time window may correspond to a common multiple of durations of a time slot. For example, as shown in FIG. 6, a duration of a time slot in a first wireless communication system RAT1 may correspond to one-fourth of a duration of a time slot in a second wireless communication system RAT2, and accordingly, the time window may be a multiple of the duration of the time slot in the second wireless communication system RAT2. In embodiments, the time window may be tens of milliseconds or hundreds of milliseconds. When considering that the measuring duration is several seconds or tens of seconds, different timing between the slots in the first wireless communication system RAT1 and the second wireless communication system RAT2 may be ignored.

Figure 7:
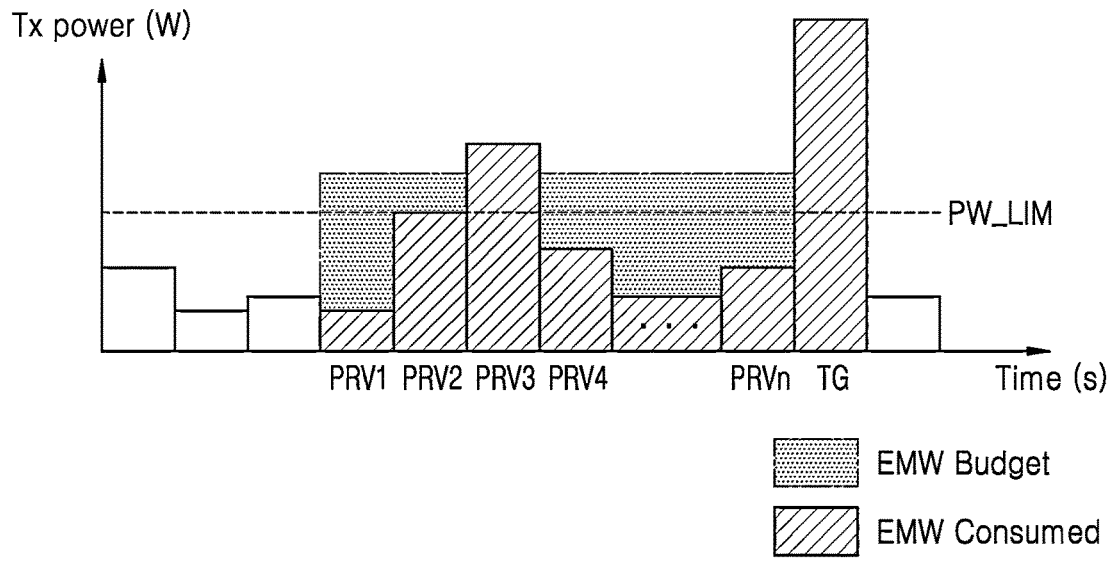
FIG. 7 is a graph of an example of obtaining an electromagnetic wave value amplified during a target duration compared to a previous duration, according to embodiments.
Figure 8:
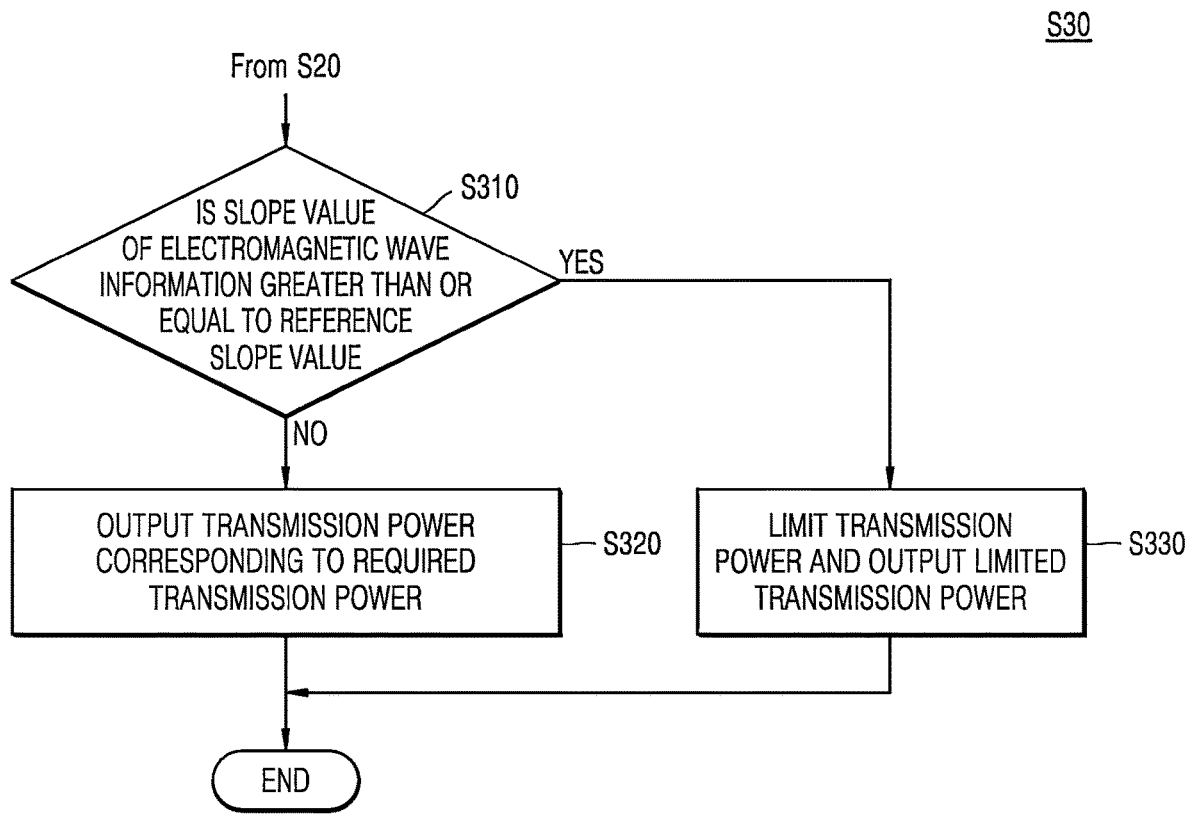
FIG. 8 is a flowchart of a method of determining whether to limit transmission power based on electromagnetic wave tendency information in a target duration, according to embodiments.

FIG. 7 is a graph of an example of obtaining an electromagnetic wave value amplified during the target duration TG compared to the first to nth previous durations PRV1 to PRVn, according to embodiments, and FIG. 8 is a flowchart of a method of determining whether to limit transmission power based on electromagnetic wave tendency information in a target duration, according to embodiments.

Referring to FIG. 7, the communication processor 100 may detect that a higher amount of transmission power has been output during the target duration TG compared to the first to nth previous durations PRV1 to PRVn, and accordingly, the communication processor 100 may obtain greater electromagnetic wave tendency information than that of the example of FIG. 5. For example, the communication processor 100 may obtain a greater slope value with respect to target electromagnetic wave information in the example of FIG. 7 than in the example of FIG. 5.

In embodiments of the inventive concepts, whether to limit transmission power may be determined by comparing pre-designated or alternatively, given reference electromagnetic wave tendency information to electromagnetic wave tendency information obtained during the target duration TG. For example, when it is determined that an electromagnetic wave slope value of the target duration TG is greater than a pre-designated or alternatively, given reference electromagnetic wave slope value, the wireless communication device 10 may operate in the limitation mode of limiting transmission power.

Hereinafter, it will be described that the communication processor 100 obtains a tendency of electromagnetic wave information by comparing a slope value of electromagnetic wave information to a reference slope value, but the communication processor 100 according to the inventive concepts is not limited thereto, and embodiments capable of obtaining a tendency of electromagnetic wave information during a target duration may be included in the inventive concepts.

Referring to FIG. 8, in operation S310, the communication processor 100 may compare a slope value of electromagnetic wave information during a target duration to a reference slope value. The reference slope value may be a reference value by which the wireless communication device 10 determines whether to operate in the limitation mode, and the wireless communication device 10 may have a pre-designated reference slope value but is not limited thereto, and the wireless communication device 10 may have a variable reference slope value. For example, the reference slope value may vary according to communication quality, and/or a power demand and/or supply status, of the wireless communication device 10.

In operation S320, when it is determined that the slope value of the electromagnetic wave during the target duration is less than the reference slope value, the communication processor 100 may control the power amplifier 500 or the power converter 300 to output transmission power corresponding to required (or desired) transmission power. The required (or desired) transmission power may be transmission power used for the wireless communication device 10 to perform wireless communication of required (or desired) quality. That is, when it is determined that the slope value of the electromagnetic wave during the target duration is less than the reference slope value, the wireless communication device 10 may determine that an SAR or a PD does not have to be limited, so that optimal (e.g., high, sufficient, etc.) wireless communication quality is maintained without limiting transmission power.

In operation S330, when it is determined that that the slope value of the electromagnetic wave information during the target duration is greater than or equal to the reference slope value, the communication processor 100 may limit transmission power and output the limited transmission power. That is, when it is determined that a tendency of electromagnetic wave information rapidly increases, the wireless communication device 10 may limit transmission power so that an SAR or a PD does not exceed a pre-regulated or alternatively, given emission limitation. Hereinafter, embodiments of dynamically setting a transmission power amount to be limited according to a ratio of remaining transmission power to available transmission power when the wireless communication device 10 according to the inventive concepts operates in the limitation mode will be described.

Figure 9:
FIG. 9 is a flowchart of a method of outputting transmission power in any one of a plurality of modes based on a remaining rate with respect to available transmission power, according to embodiments.
Figure 10:
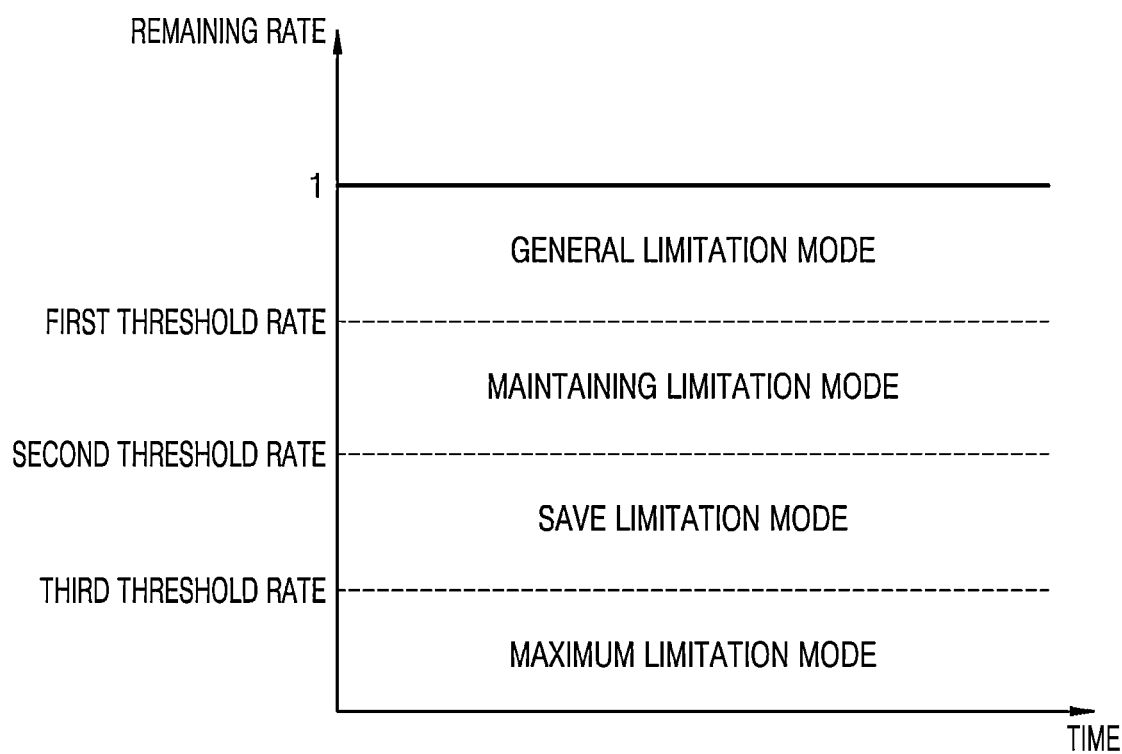
FIG. 10 is a graph of an example of dividing a plurality of limitation modes based on threshold rates, according to embodiments.

FIG. 9 is a flowchart of a method of outputting transmission power in any one of a plurality of modes based on a remaining rate with respect to available transmission power, according to embodiments, and FIG. 10 is a graph of an example of dividing a plurality of limitation modes based on threshold rates, according to embodiments.

Referring to FIG. 9, the wireless communication device 10 according to the inventive concepts may calculate a remaining rate of remaining transmission power with respect to available transmission power and select any one of a plurality of limitation modes by comparing a plurality of threshold rates to the remaining rate. Each limitation mode may be identified according to limited transmission power to be limited.

The communication processor 100 may compare a calculated remaining rate to a first threshold rate in operation S331, and operate in a general limitation mode in operation S337 when the remaining rate is greater than or equal to the first threshold rate. According to embodiments, the general limitation mode may be a mode of minimally limiting transmission power (e.g., applying a smallest increment of limitation to the transmission power), and the communication processor 100 may set, as limited transmission power, a power amount obtained by dividing available transmission power by the number of time windows.

For example, when available transmission power during a measuring duration is 200 dBm, and the number of time windows is 10, the limited transmission power in the general limitation mode may be 20 dBm. In this case, by considering errors of transmission power and electromagnetic wave information, and the like, the communication processor 100 may set, as the limited transmission power (e.g., the transmission power limit), a power amount obtained by subtracting a certain power amount from the power amount obtained by dividing available transmission power by the number of time windows (e.g., a number of durations in the measuring period, for example, the sum of the at least one previous durations and the target duration). For example, the certain power amount may be set to 3 dBm, and thus, the limited transmission power in the general limitation mode may be 17 dBm.

When it is determined that the calculated remaining rate is less than the first threshold rate, the communication processor 100 may compare the remaining rate to a second threshold rate in operation S332, and operate in the maintaining limitation mode in operation S336 when the remaining rate is greater than or equal to the second threshold rate. Referring to FIG. 10, the second threshold rate may be less than the first threshold rate. According to embodiments, the maintaining limitation mode may be a mode of performing a control so that transmission power used during the measuring duration is continuously maintained. In the maintaining limitation mode, the wireless communication device 10 may set, as limited transmission power, transmission power corresponding to electromagnetic wave information of a previous duration among at least one previous duration, which is out of (e.g., external to) the measuring duration.

Referring to FIG. 5, the wireless communication device 10 may control the power amplifier 500 or the power converter 300 to output transmission power in a subsequent duration (e.g., a subsequent period of time), the transmission power corresponding to electromagnetic wave information of the first previous duration PRV1, in which the electromagnetic wave information was obtained at the oldest time, among the measuring duration. Accordingly, when the wireless communication device 10 operates in the maintaining limitation mode, the wireless communication device 10 may control the transmission power so that electromagnetic wave information obtained during the measuring duration is not increased but continuously maintained or reduced.

When it is determined that the calculated remaining rate is less than the second threshold rate, the communication processor 100 may compare the remaining rate to a third threshold rate in operation S333, and operate in the save limitation mode in operation S335 when the remaining rate is greater than or equal to the third threshold rate. Referring to FIG. 10, the third threshold rate may be less than the second threshold rate. The save limitation mode may be a mode of performing a control so that remaining transmission power during the measuring duration is distributedly used during a subsequent measuring duration. That is, in the save limitation mode, the wireless communication device 10 may set, as limited transmission power, a power amount obtained by dividing the remaining transmission power by the number of time windows (e.g., a number of durations in the measuring period, for example, the sum of the at least one previous durations and the target duration). For example, when the available transmission power is 200 dBm, the remaining transmission power is 50 dBm, and the number of time windows is 10, the limited transmission power may be set to 5 dBm so that 50 dBm is used in the 10 time windows.

When it is determined that the calculated remaining rate is less than the third threshold rate, the communication processor 100 may operate in operation S334 in the maximum (or highest) limitation mode of using only a minimum (or lowest) transmission power to follow an electromagnetic wave limitation regulation. When the wireless communication device 10 operates in the maximum (or highest) limitation mode, the wireless communication device 10 may set pre-designated or alternatively, given minimum (or lowest) transmission power as limited transmission power.

Even when operating in the limitation mode, the wireless communication device 10 according to the inventive concepts may differently set limited transmission power according to a ratio of remaining transmission power to available transmission power, thereby more efficiently running a transmission power limitation policy for following the electromagnetic wave limitation regulation. In addition, when the wireless communication device 10 performs a communication operation with a plurality of wireless communication systems, the wireless communication device 10 may differently set available transmission power and limited transmission power according to transmission power required for each wireless communication. Hereinafter, embodiments of limiting transmission power when operating with a plurality of wireless communication systems will be described.

Figure 11:
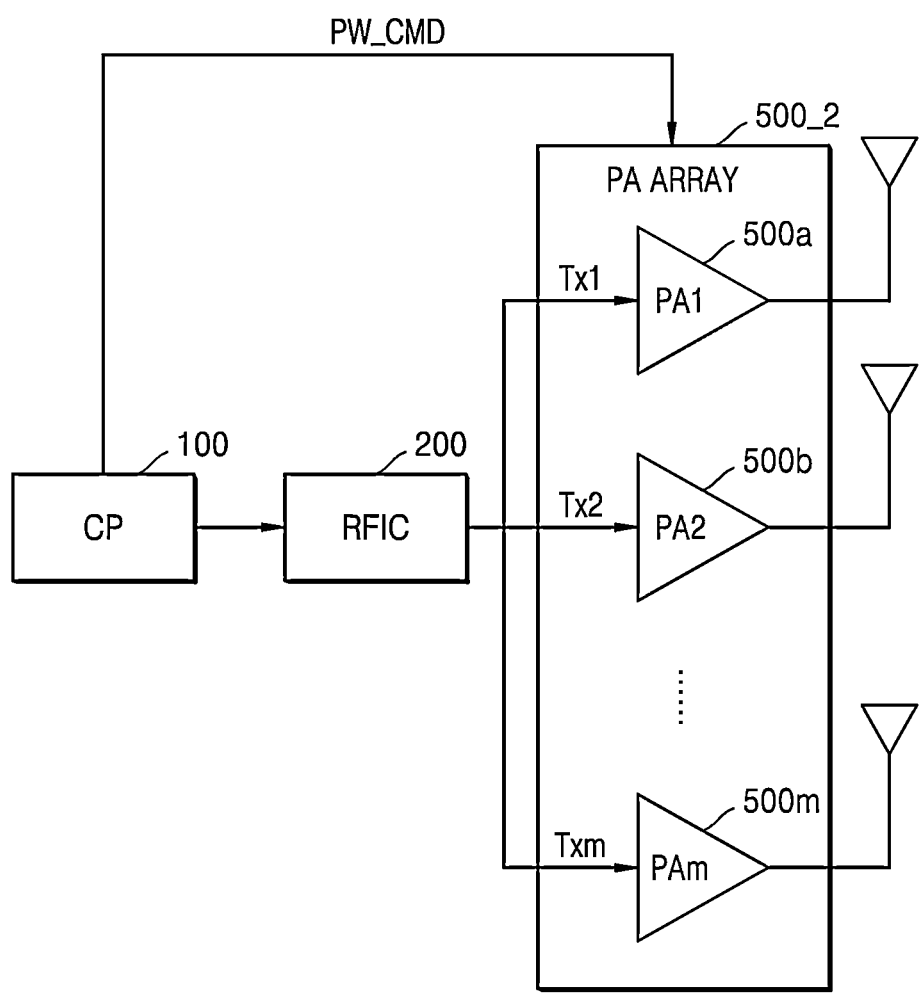
FIG. 11 is a block diagram of a wireless communication device for performing a plurality of wireless communications by using a plurality of power amplifiers, according to embodiments.

FIG. 11 is a block diagram of the wireless communication device 10 for performing a plurality of wireless communications by using a plurality of power amplifiers 500, according to embodiments.

Referring to FIG. 11, the wireless communication device 10 may perform a wireless communication operation according to a plurality of wireless communication systems. Operations of the communication processor 100 and the RFIC 200 in FIG. 11 have been described above with reference to FIG. 1, and thus, a detailed description thereof is omitted herein. The communication processor 100 according to the inventive concepts may control each of power amplifiers 500 $a$ to 500$m$ included in a power amplifier array 500_2 to perform a communication operation with set limited transmission power, and the RFIC 200 may provide respective transmission signals to be transmitted to the power amplifiers 500 $a$ to 500$m$.

The power amplifier array 500_2 may include the power amplifiers 500 $a$ to 500$m$, and each of the power amplifiers 500 $a$ to 500$m$ may be connected to an antenna and output an amplified transmission signal through the antenna. The power amplifiers 500 $a$ to 500$m$ included in the power amplifier array 500_2 may operate with different wireless communication systems but are not limited thereto and may be grouped, wherein power amplifier groups may perform different wireless communication operations, respectively.

A wireless communication system to be described below may be, as a non-limiting example, a wireless communication system using a cellular network, such as a 5G NR system, an LTE system, an LTE-Advanced system, a code division multiple access (CDMA) system, or a global system for mobile communications (GSM), a wireless personal area network (WPAN), or another wireless communication system.

The wireless communication device 10 according to the inventive concepts may simultaneously or contemporaneously perform a wireless communication operation with a plurality of wireless communication systems and set available transmission power for each wireless communication system based on a plurality of pieces of electromagnetic wave information according to the plurality of wireless communication systems. For example, the wireless communication device 10 may operate with both an NR system and an LTE system and differently set available transmission power for each system.

Figure 12:
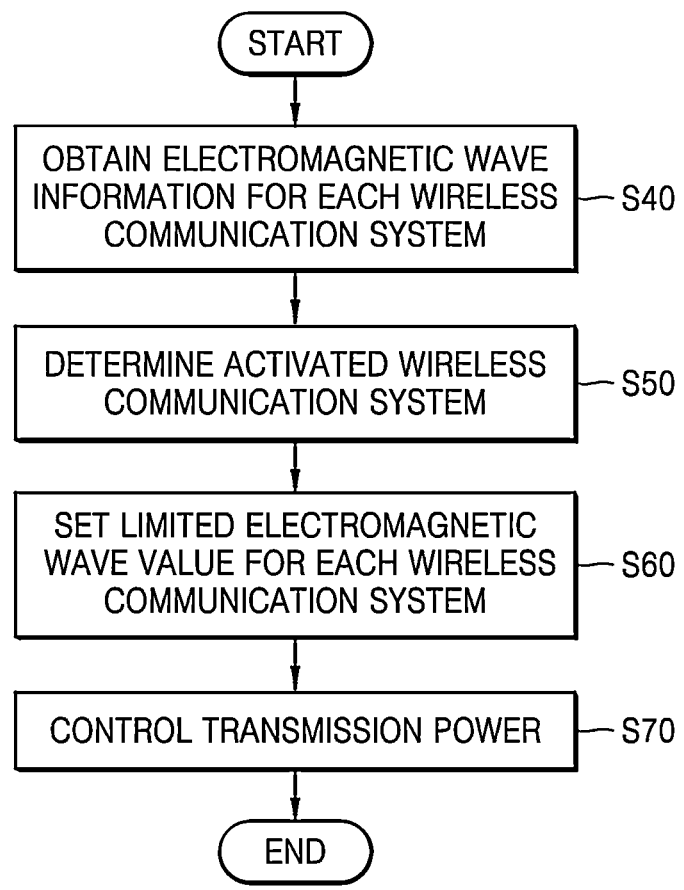
FIG. 12 is a flowchart of a method of controlling transmission power when a plurality of wireless communications are performed, according to embodiments.

FIG. 12 is a flowchart of a method of controlling transmission power when a plurality of wireless communications are performed, according to embodiments.

Referring to FIG. 12, when the wireless communication device 10 performs wireless communication according to a plurality of wireless communication systems, the wireless communication device 10 may control transmission power by obtaining electromagnetic wave information of each wireless communication system and setting available transmission power for each wireless communication system.

In operation S40, the wireless communication device 10 may obtain electromagnetic wave information of each wireless communication system. According to embodiments, an operating frequency band may vary for each wireless communication system, and any one of an SAR and/or a PD according to a frequency band may be obtained as electromagnetic wave information. For example, an SAR may be used as electromagnetic wave information for an LTE/frequency range 1 (FR1) communication system for performing a wireless communication operation in a frequency band of 6 GHz or less, and a PD may be used as electromagnetic wave information for an NR communication system for performing a wireless communication operation in a frequency band of greater than 6 GHz.

In operation S50, the wireless communication device 10 may determine a wireless communication system activated in a target duration. When it is determined that only one wireless communication system is activated in the target duration, the wireless communication device 10 may perform a communication operation by controlling transmission power according to embodiments of FIG. 4. Otherwise, when it is determined that a plurality of wireless communication systems are activated (e.g., when a plurality of different wireless communications are performed), the wireless communication device 10 may set a limited electromagnetic wave value for each wireless communication system in operation S60.

According to embodiments, a limited electromagnetic wave value for each wireless communication system may be set to satisfy mathematical formula 1.

$$\sum_{n=0}^{N-1} \frac{SAR_{avr,n}}{SAR_{limit}} + \sum_{m=0}^{M-1} \frac{PD_{avr,m}}{PD_{limit}} \leq 1 \quad \text{[Mathematical formula 1]}$$

$SAR_{avr,n}$ and $PD_{avr,m}$ may be the electromagnetic wave information obtained in operation S40 during a measuring duration, wherein $SAR_{avr,n}$ may be an average value of SARs output from n RF sources, and $PD_{avr,m}$ may be an average value of PDs output from m RF sources. $SAR_{limit}$ may be a limited value of a pre-defined or alternatively, given SAR, and $PD_{limit}$ may be a limited value of a pre-defined or alternatively, given PD. That is, $$\sum_{n=0}^{N-1} \frac{SAR_{avr,n}}{SAR_{limit}}$$

may be a total exposure ratio (TER) of SARs during the measuring duration, and $$\sum_{m=0}^{M-1} \frac{PD_{avr,m}}{PD_{limit}}$$

may be a TER of PDs during the measuring duration. According to embodiments of the inventive concepts, when a wireless communication operation is performed by a plurality of RF sources (e.g., RF resources of the wireless communication device 10), the wireless communication device 10 may control transmission power so that a sum of TERs for all the RF sources is 1 or less.

The limited electromagnetic wave value set for each wireless communication system may be a TER, and the wireless communication device 10 may adjust the TER based on electromagnetic wave information obtained in the measuring duration. For example, because an LTE system is considered as an anchor in an E-UTRAN NR—dual connectivity (EN-DC) environment, the wireless communication device 10 may first set a TER for the LTE system and then allocate remaining power based on a TER for PDs. In this case, the TER for PDs may be a value obtained by subtracting the TER for the LTE system from 1. However, embodiments of the inventive concepts are not limited thereto, and the wireless communication device 10 may determine the TERs by weighted-averaging the electromagnetic wave information obtained in the measuring duration or set the TERs based on priorities according to a wireless communication policy.

In operation S70, the wireless communication device 10 may control transmission power according to the limited electromagnetic wave value set in operation S60. The limited electromagnetic wave value may be the TER set in operation S60, and the wireless communication device 10 may determine whether to limit available transmission power by comparing the set TER to a TER according to electromagnetic wave information measured thereafter. For example, when the TER measured thereafter exceeds the set TER, transmission power may be controlled by limiting the available transmission power, but when the TER measured thereafter is less than the set TER, transmission power may be controlled without limiting the available transmission power.

Figure 13:
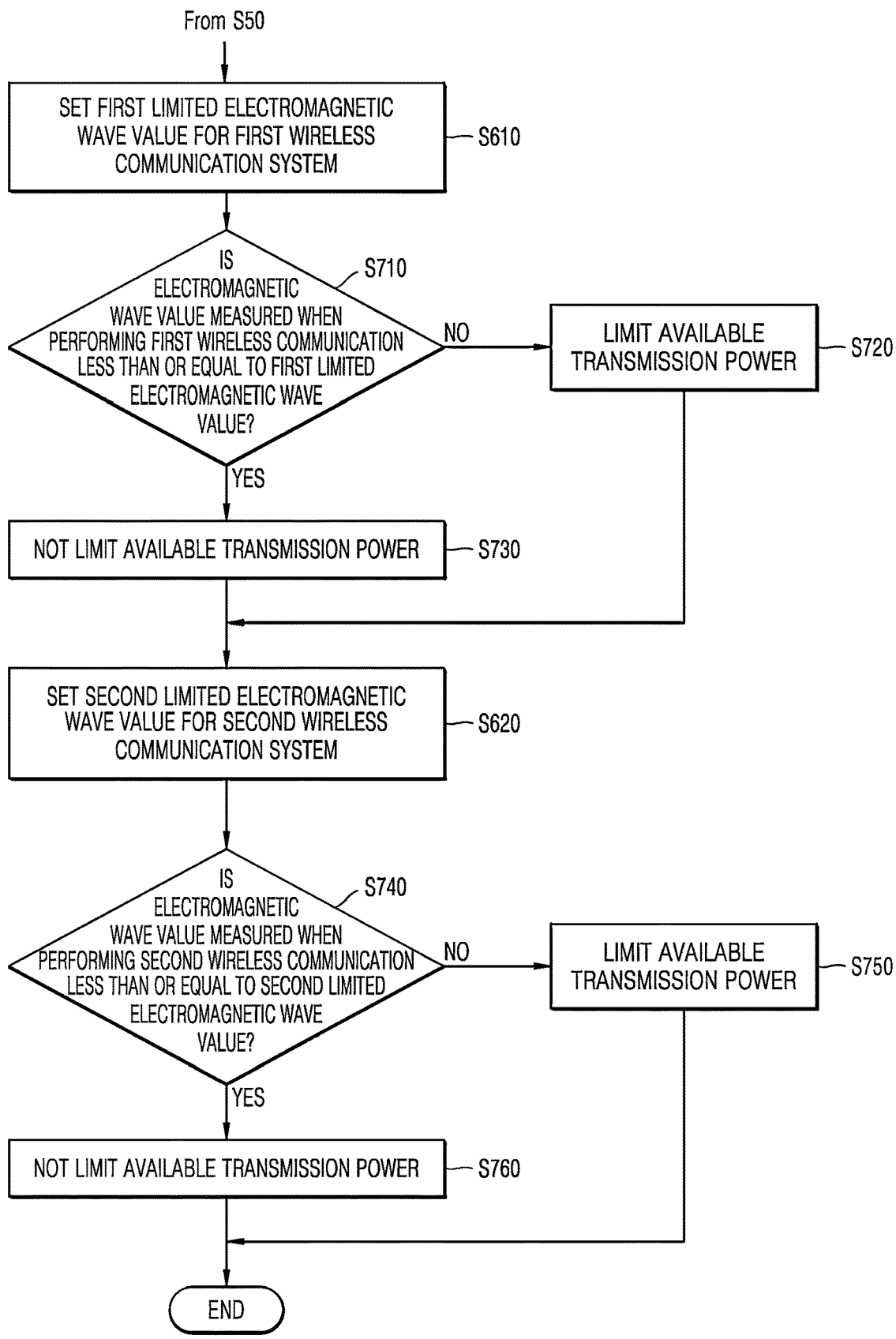
FIG. 13 is a flowchart of a method of controlling transmission power when first wireless communication and second wireless communication are performed, according to embodiments.

FIG. 13 is a flowchart of a method of controlling transmission power when first wireless communication and second wireless communication are performed, according to embodiments.

When the wireless communication device 10 performs a wireless communication operation with first and second wireless communication systems discriminated from each other, a limited electromagnetic wave value for each wireless communication system may be set. In this case, the wireless communication device 10 according to embodiments may control transmission power for any one wireless communication system according to priorities of the first and second wireless communication systems, and then control transmission power for the other wireless communication system.

In operation S610, the wireless communication device 10 may set a first limited electromagnetic wave value based on electromagnetic wave information obtained when performing the first wireless communication system (e.g., performing communication via the first wireless communication system). The first limited electromagnetic wave value may be a limited value of a TER for the first wireless communication system, and the limited value of the TER may be differently set according to a communication policy.

In operation S710, the wireless communication device 10 may obtain a new electromagnetic wave value based on electromagnetic wave information obtained during a subsequent measuring duration, and compare the first limited electromagnetic wave value to the electromagnetic wave value obtained when performing first wireless communication. For example, the wireless communication device 10 may calculate a new TER for an SAR based on SARs obtained in the measuring duration after operation S610 and compare the calculated TER to the limited value of the TER for the first wireless communication.

When the electromagnetic wave value obtained when performing the first wireless communication exceeds the first limited electromagnetic wave value, the wireless communication device 10 may limit available transmission power for the first wireless communication in operation S720. According to embodiments, the wireless communication device 10 may set, as the available transmission power, a value obtained by multiplying the first limited electromagnetic wave value by a transmission power corresponding to pre-defined or alternatively, given electromagnetic wave information. For example, a value obtained by multiplying the limited value of the TER by a transmission power corresponding to a pre-defined or alternatively, given SAR limited value may be set as the available transmission power. However, embodiments of the inventive concepts are not limited thereto, and may include embodiments of limiting transmission power to be output for the first wireless communication to follow an electromagnetic wave limitation regulation.

When the electromagnetic wave value obtained when performing the first wireless communication is less than or equal to the first limited electromagnetic wave value, the wireless communication device 10 may limit transmission power without limiting the available transmission power in operation S730. Embodiments of the inventive concepts of limiting transmission power have been described above with reference to FIG. 4, and thus, a detailed description thereof is omitted herein.

In operation S620, the wireless communication device 10 may set a second limited electromagnetic wave value for the second wireless communication system that is different from the first wireless communication system. According to embodiments, the second wireless communication system may have a lower priority than the first wireless communication system, and the second limited electromagnetic wave value may be determined according to the set first limited electromagnetic wave value. The second limited electromagnetic wave value may be a limited value of a TER for the second wireless communication system, and the limited value of the TER may be differently set according to the communication policy.

In operation S740, the wireless communication device 10 may obtain a new electromagnetic wave value based on electromagnetic wave information obtained during a subsequent measuring duration, and compare the second limited electromagnetic wave value to the electromagnetic wave value obtained when performing second wireless communication. For example, the wireless communication device 10 may calculate a new TER for an SAR based on SARs obtained in the measuring duration after operation S620 and compare the calculated TER to the limited value of the TER for the second wireless communication.

When the electromagnetic wave value obtained when performing the second wireless communication exceeds the second limited electromagnetic wave value, the wireless communication device 10 may limit available transmission power for the second wireless communication in operation S750. When the electromagnetic wave value obtained when performing the second wireless communication is less than or equal to the second limited electromagnetic wave value, the wireless communication device 10 may limit transmission power without limiting the available transmission power in operation S760.

Figure 14:
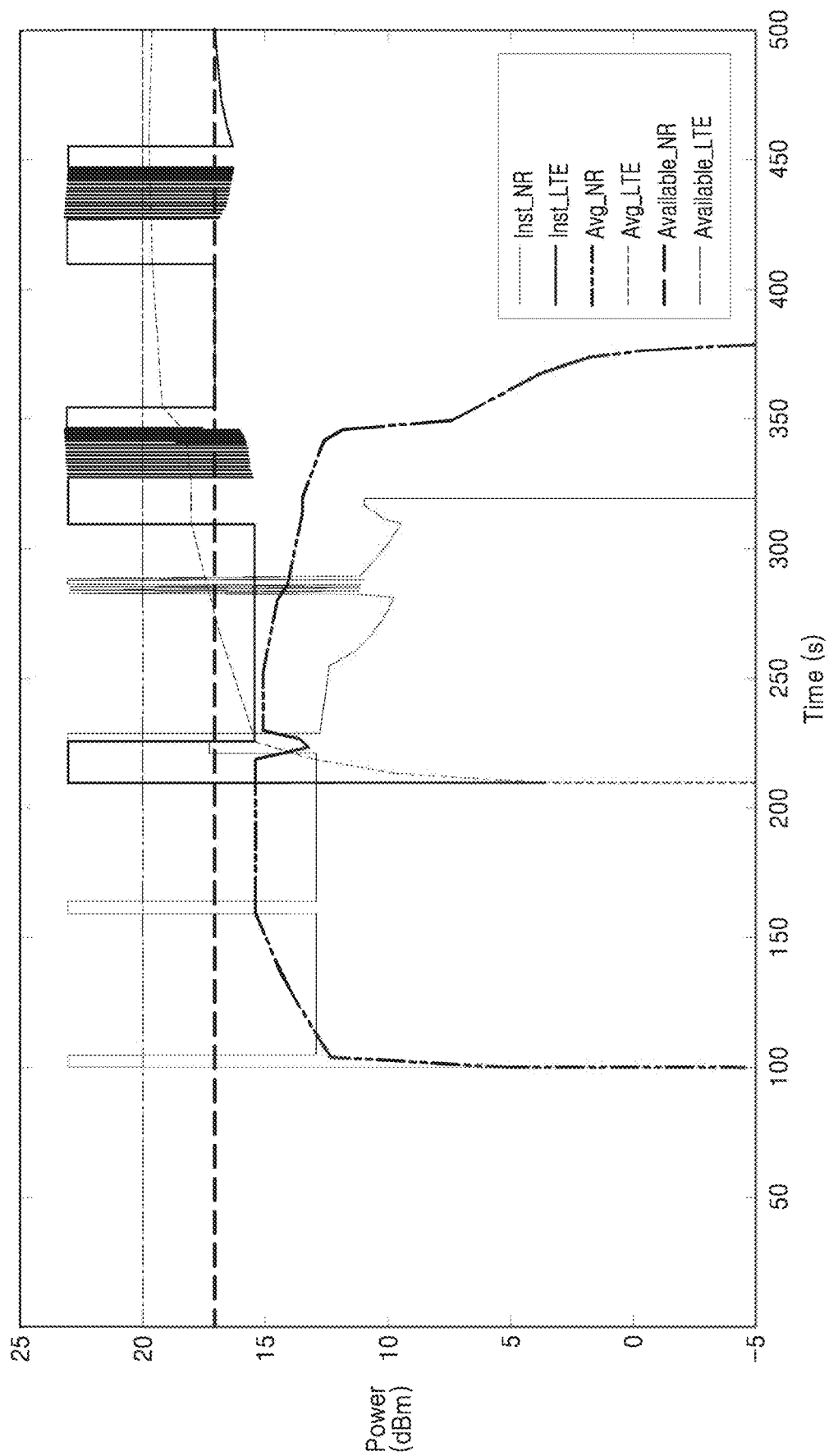
FIG. 14 is a graph of an example of outputting transmission power based on limited transmission power corresponding to each of a plurality of wireless communications when the plurality of wireless communications are performed, according to embodiments.

FIG. 14 is a graph of an example of outputting transmission power based on limited transmission power corresponding to each of a plurality of wireless communications when the plurality of wireless communications are performed, according to embodiments.

Referring to FIG. 14, the wireless communication device 10 may simultaneously or contemporaneously perform different wireless communications according to an NR system and an LTE system in a period between 100 seconds and 350 seconds. In this case, according to embodiments of the inventive concepts, available transmission power for the NR system (e.g., Available_NR) may be differently set from available transmission power for the LTE system (e.g., Available_LTE), and even when instantaneous transmission power (e.g., Inst_NR and Inst_LTE) higher than the available transmission power is output, average transmission power (e.g., Avg_NR and Avg_LTE) according to each wireless communication system is controlled to be lower than the available transmission power.

Figure 15:
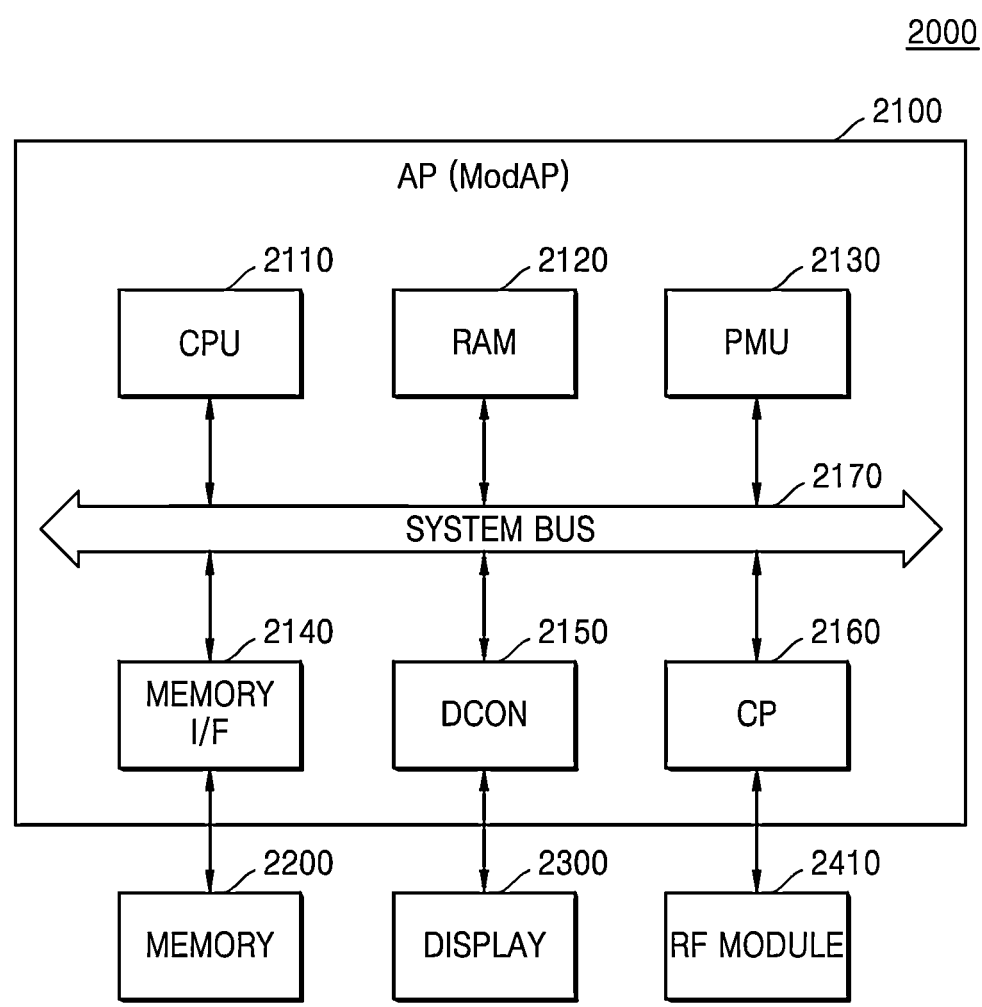
FIG. 15 is a block diagram of a wireless communication device for controlling transmission power, according to embodiments of the inventive concepts.

FIG. 15 is a block diagram of a wireless communication device 2000 for controlling transmission power, according to embodiments of the inventive concepts.

Referring to FIG. 15, the wireless communication device 2000 may include an application processor (AP) 2100, a memory 2200, a display 2300, and/or an RF module 2410. Besides, the wireless communication device 2000 may further include various components such as a lens, a sensor, and/or an audio module.

The AP 2100 may be implemented by a system on chip (SoC) and include a central processing unit (CPU) 2110, random access memory (RAM) 2120, a power management unit (PMU) 2130, a memory interface (IF) 2140, a display controller (DCON) 2150, a communication processor 2160, and/or a system bus 2170. Besides, the AP 2100 may further include various integrated processors (IP). The AP 2100 may be referred to as ModAP because a function of a communication processor chip is integrated therein.

The CPU 2110 may generally control operations of the AP 2100 and the wireless communication device 2000. The CPU 2110 may control an operation of each component in the AP 2100. In addition, the CPU 2110 may be implemented by a multi-core. The multi-core is a single computing component having two or more independent cores.

The RAM 2120 may temporarily store programs, data, or instructions. For example, programs and/or data stored in the memory 2200 may be temporarily stored in the RAM 2120 according to control or booting code of the CPU 2110. The RAM 2120 may be implemented by dynamic RAM (DRAM) or static RAM (SRAM).

The PMU 2130 may manage power of each component in the AP 2100. The PMU 2130 may also determine an operating situation of each component in the AP 2100 and control an operation of the AP 2100.

The memory IF 2140 may generally control an operation of the memory 2200 and control data exchange between each component in the AP 2100 and the memory 2200. The memory IF 2140 may write data on the memory 2200 or read data from the memory 2200, in response to a request of the CPU 2110.

The DCON 2150 may transmit, to the display 2300, image data to be displayed on the display 2300. The display 2300 may be implemented by a flat display such as a liquid crystal display (LCD), an organic light-emitting diode (OLED) or a flexible display.

The communication processor 2160 may modulate data to be transmitted so as to be suitable for a wireless environment for wireless communication and demodulate received data. The communication processor 2160 may perform digital communication with the RF module 2410.

As a reference, the communication processor 100 described above with reference to FIG. 1 may be implemented in the communication processor 2160.

The RF module 2410 may convert a high frequency signal received through an antenna into a low frequency signal and transmit the low frequency signal to the communication processor 2160. In addition, the RF module 2410 may convert a low frequency signal received from the communication processor 2160 into a high frequency signal and transmit the high frequency signal to the outside of the wireless communication device 2000 through the antenna. In addition, the RF module 2410 may amplify or filter a signal.

As a reference, the RFIC 200, the power converter 300, the duplexer 400, the power amplifier 500, and/or the antenna ANT described above with reference to FIG. 1 may be implemented in the RF module 2410. Accordingly, the power converter may be implemented in the RF module 2410 as described above with reference to FIGS. 4 to 14.

In determining an output transmission power for a wireless communication device, a tradeoff exists between the high quality of service provided by a high transmission power, and the high heat and the high electromagnetic wave absorption resulting from high transmission power. Conventional devices for wireless communication determine an output high transmission power to provide a high quality of service without sufficient consideration of the excessive heat and electromagnetic wave absorption resulting from the high transmission power. Accordingly, the conventional devices generate excessive amounts of heat, as well as excessive amounts of electromagnetic energy that may be absorbed by a user of the conventional devices, especially in devices using a high frequency band such as mmWave.

However, according to embodiments, improved devices are provided for wireless communication. For example, the improved devices set a transmission power limit to prevent or reduce excessive transmission power output. Accordingly, the improved devices overcome the deficiencies of the conventional devices to reduce heat generation and electromagnetic energy absorption while maintaining a sufficiently high quality of service, especially in devices using a high frequency band such as mmWave.

According to embodiments, operations described herein as being performed by the wireless communication device 10, the communication processor 100, the RFIC 200, the power converter 300, the duplexer 400, the power amplifier 500, the power detector 600, the command generator 110, the transmission processor 120, the reception processor 130, a transmission circuit 210, the reception circuit 220, the local oscillator LO, the first mixer 211, the first baseband filter 212, the second mixer 221, the second baseband filter 222, the electromagnetic wave information estimator 101, the remaining rate calculator 102, the electromagnetic wave tendency information calculator 103, the mode selector 104, the power amplifier array 500_2, the wireless communication device 2000, the AP 2100, the RF module 2410, the CPU 2110, the PMU 2130, the memory interface 2140, the display controller 2150 and/or the communication processor 2160 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" (e.g., the memory included in the wireless communication device 10) for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order While the inventive concepts have been particularly shown and described with reference to embodiments thereof, it will be understood that various changes in form and details may be made therein without departing from the spirit and scope of the following claims.

What is claimed is:

1. A method of controlling transmission power of a wireless communication device, the method comprising:
    obtaining first electromagnetic wave information from the wireless communication device, the first electromagnetic wave information being obtained during a target duration;
    obtaining electromagnetic wave tendency information in the target duration based on the first electromagnetic wave information and second electromagnetic wave information, the second electromagnetic wave information being obtained during at least one previous duration; and
controlling the transmission power based on the electromagnetic wave tendency information.

2. The method of claim 1, wherein the first electromagnetic wave information includes at least one of a specific absorption rate (SAR) or a power density (PD).

3. The method of claim 2, wherein the obtaining the first electromagnetic wave information comprises calculating the at least one of the SAR or the PD based on a strength of transmission power output from the wireless communication device during the target duration.

4. The method of claim 1, wherein
the target duration includes a plurality of time slots; and
the obtaining the first electromagnetic wave information obtains the first electromagnetic wave information based on transmission power used for each of the plurality of time slots.

5. The method of claim 1, wherein the electromagnetic wave tendency information includes a slope value of the first electromagnetic wave information with respect to the second electromagnetic wave information.

6. The method of claim 5, wherein the controlling the transmission power comprises:
outputting the transmission power based on a transmission power limit in response to the slope value being greater than or equal to a reference slope value; and
outputting a desired transmission power in response to the slope value being less than the reference slope value.

7. The method of claim 1, further comprising:
updating remaining transmission power obtained during the at least one previous duration based on the first electromagnetic wave information to obtain an updated remaining transmission power; and
setting a transmission power limit according to a ratio of the updated remaining transmission power to an available transmission power.

8. The method of claim 1, further comprising:
setting a limited electromagnetic wave value for each of a plurality of different wireless communications performed based on a plurality of radio frequency (RF) resources; and
outputting the transmission power based on a transmission power limit such that an average electromagnetic wave value measured during a measuring duration is less than the limited electromagnetic wave value, the measuring duration including the target duration and the at least one previous duration.

9. A wireless communication device for controlling transmission power, the wireless communication device comprising:
processing circuitry configured to,
generate electromagnetic wave tendency information in a target duration based on electromagnetic wave information obtained in each of the target duration and at least one previous duration, and
control the transmission power based on the electromagnetic wave tendency information; and
at least one power amplifier configured to output an amplified transmission signal according to the transmission power.

10. The wireless communication device of claim 9, wherein the electromagnetic wave information includes at least one of a specific absorption rate (SAR) or a power density (PD).

11. The wireless communication device of claim 10, wherein the processing circuitry is configured to:
detect a strength of transmission power output from the wireless communication device during the target duration; and
calculate the at least one of the SAR or the PD based on the strength of the transmission power output from the wireless communication device.

12. The wireless communication device of claim 9, wherein
the target duration includes a plurality of time slots; and
the processing circuitry is configured to obtain the electromagnetic wave information during the target duration based on transmission power used for each of the plurality of time slots.

13. The wireless communication device of claim 9, wherein the electromagnetic wave tendency information includes a slope value of the electromagnetic wave information obtained during the target duration with respect to the electromagnetic wave information obtained during the at least one previous duration.

14. The wireless communication device of claim 13, wherein the processing circuitry is configured to:
limit the transmission power in response to the slope value being greater than or equal to a reference slope value; and
skip limitation of the transmission power in response to the slope value being less than the reference slope value.

15. The wireless communication device of claim 9, wherein the processing circuitry is further configured to:
update remaining transmission power obtained during the at least one previous duration based on the electromagnetic wave information obtained during the target duration to obtain an updated remaining transmission power; and
set a transmission power limit according to a ratio of the updated remaining transmission power to an available transmission power.

16. The wireless communication device of claim 9, wherein the processing circuitry is further configured to:
set a limited electromagnetic wave value for each of a plurality of different wireless communications performed based on a plurality of radio frequency (RF) resources and
limit the transmission power such that an average electromagnetic wave value measured during a measuring duration is less than the limited electromagnetic wave value, the measuring duration including the target duration and the at least one previous duration.

17. A method of limiting transmission power during a measuring duration, the method comprising:
obtaining electromagnetic wave information from a wireless communication device during a target duration; and
limiting the transmission power such that only a portion of a desired transmission power is output in a limitation mode, the limitation mode being activated according to electromagnetic wave tendency information in the target duration, the measuring duration including the target duration,
wherein the limiting the transmission power comprises setting a transmission power limit according to a remaining rate, the remaining rate being based on a ratio of a remaining transmission power to an available transmission power during the measuring duration.

18. The method of claim 17, wherein the electromagnetic wave tendency information includes a slope value of the electromagnetic wave information of the target duration with respect to electromagnetic wave information of at least one previous duration.

19. The method of claim 17, wherein the setting the transmission power limit sets the transmission power limit to a value obtained by dividing the available transmission power by a number of durations based on the remaining rate being greater than or equal to a first threshold rate, the number of durations being based on at least one previous duration and the target duration.

20. The method of claim 19, wherein the setting the transmission power limit sets the transmission power limit to a transmission power during a first previous duration outside of the measuring duration based on the remaining rate being less than the first threshold rate and greater than or equal to a second threshold rate.

* * * * *